United States Patent
Franco et al.

(10) Patent No.: US 9,373,096 B2
(45) Date of Patent: *Jun. 21, 2016

(54) SMART CLOUD WORKLOAD BALANCER

(71) Applicant: International Business Machines Corporation, Armonk, NY (US)

(72) Inventors: Lucas G. Franco, Sao Paulo (BR); Lucas M. Lima, Sao Paulo (BR); Ana B. Parra, Sao Paulo (BR); Jose A. Reguera, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/531,068

(22) Filed: Nov. 3, 2014

(65) Prior Publication Data

US 2015/0051942 A1    Feb. 19, 2015

Related U.S. Application Data

(63) Continuation of application No. 13/204,858, filed on Aug. 8, 2011, now Pat. No. 8,909,785.

(51) Int. Cl.

| G06F 15/173 | (2006.01) |
|---|---|
| G06Q 10/06 | (2012.01) |
| H04L 29/08 | (2006.01) |
| G06F 9/06 | (2006.01) |
| H04L 29/00 | (2006.01) |
| G06F 9/455 | (2006.01) |
| G06F 17/30 | (2006.01) |

(52) U.S. Cl.
CPC ............ G06Q 10/06315 (2013.01); G06F 9/06 (2013.01); G06F 9/45533 (2013.01); G06F 17/30289 (2013.01); G06Q 10/0633 (2013.01); H04L 29/00 (2013.01); H04L 67/1097 (2013.01)

(58) Field of Classification Search
CPC ........ H04L 67/1097; H04L 29/00; G06F 9/06; G06F 17/30289; G06F 9/45533; G06Q 10/0633; G06Q 10/06315
USPC ........................ 709/223–226; 718/1, 105, 104
See application file for complete search history.

(56) References Cited

U.S. PATENT DOCUMENTS

| 8,185,894 B1 * | 5/2012 | Watson | G06F 9/485 718/1 |
|---|---|---|---|
| 8,396,807 B1 * | 3/2013 | Yemini | G06Q 10/06 705/400 |
| 8,909,785 B2 | 12/2014 | Franco et al. | |

* cited by examiner

*Primary Examiner* — Joon H Hwang
*Assistant Examiner* — Abdulkader M Alriyashi
(74) *Attorney, Agent, or Firm* — Schmeiser, Olsen & Watts, LLP; John Pivnichny

(57) ABSTRACT

A method and system for dynamically optimizing workload of a cloud computing system. The cloud computing system is configured into an operative status by defining a virtual machine (VM) topology representing a respective virtual machine assignment for each physical server of the cloud computing system. An objects database (ODB) stores: business policies, a respective software cost per software application in one or more software license pools, and a power cost of the cloud computing system. It is determined that the cloud computing system does not perform optimally with respect to a total cost of the cloud computing system, which is a sum of the respective software cost and the power cost. The workload of the cloud computing system is distributed pursuant to a new VM topology that has a minimum total cost of the cloud computing system pursuant to the business policies stored in the ODB.

19 Claims, 10 Drawing Sheets

SMART CLOUD WORKLOAD BALANCER

This application is a continuation application claiming priority to Ser. No. 13/204,858, filed Aug. 8, 2011, now U.S. Pat. No. 8,909,785, issued Dec. 9, 2014.

BACKGROUND

The present invention discloses a system and associated method for dynamically optimizing workload distribution in a cloud computing system based on operating cost. Conventional workload optimization methods in cloud computing systems use static planning for overall operation. Since software licenses are required to run software application programs that services clients of the cloud computing system, statically planning the number of software licenses in the cloud computing system causes operating cost issues. When the cloud computing system acquires enough number of software licenses to fully utilize all physical servers at all time, the cloud computing system incurs unnecessary additional software license cost. Having too few number of software licenses to reduce extra cost may degrade utilization of the physical servers and performance of the cloud computing system.

BRIEF SUMMARY

According to one embodiment of the present invention, a method for dynamically optimizing workload of a cloud computing system comprises: configuring, by a smart cloud workload balancer (SCWB), the cloud computing system into an operative status by defining a virtual machine (VM) topology representing a respective virtual machine assignment for each physical server of the cloud computing system such that the cloud computing system services workload of the cloud computing system by use of the VM topology, wherein the cloud computing system comprises an objects database (ODB) storing system configuration parameters of: business policies, zero or more physical server availability zones, zero or more physical server restriction zones, zero or more physical server location pools, zero or more software license pools, a respective available licenses per software application in the software license pools, a respective software cost per said software application, a power cost of the cloud computing system, at least one virtual machine (VM), and zero or more installed licenses per VM; determining that the cloud computing system does not perform optimally with respect to a total cost of the cloud computing system based on the system configuration parameters stored in the ODB, wherein said total cost is a sum of the respective software cost and the power cost; and redistributing workload of the cloud computing system pursuant to a new VM topology that has a minimum total cost of the cloud computing system pursuant to said business policies stored in the ODB.

According to one embodiment of the present invention, a computer program product comprises a computer readable memory unit that embodies a computer readable program code. The computer readable program code contains instructions that, when run by a processor of a computer system, implement a method for dynamically optimizing workload of a cloud computing system.

According to one embodiment of the present invention, a computer system comprises a processor, a memory coupled to the processor, and a computer readable storage device coupled to the processor, said storage device containing program code configured to be executed by the processor via the memory to implement a method for dynamically optimizing workload of a cloud computing system.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for dynamically optimizing workload of a cloud computing system.

DETAILED DESCRIPTION

Figure 1:
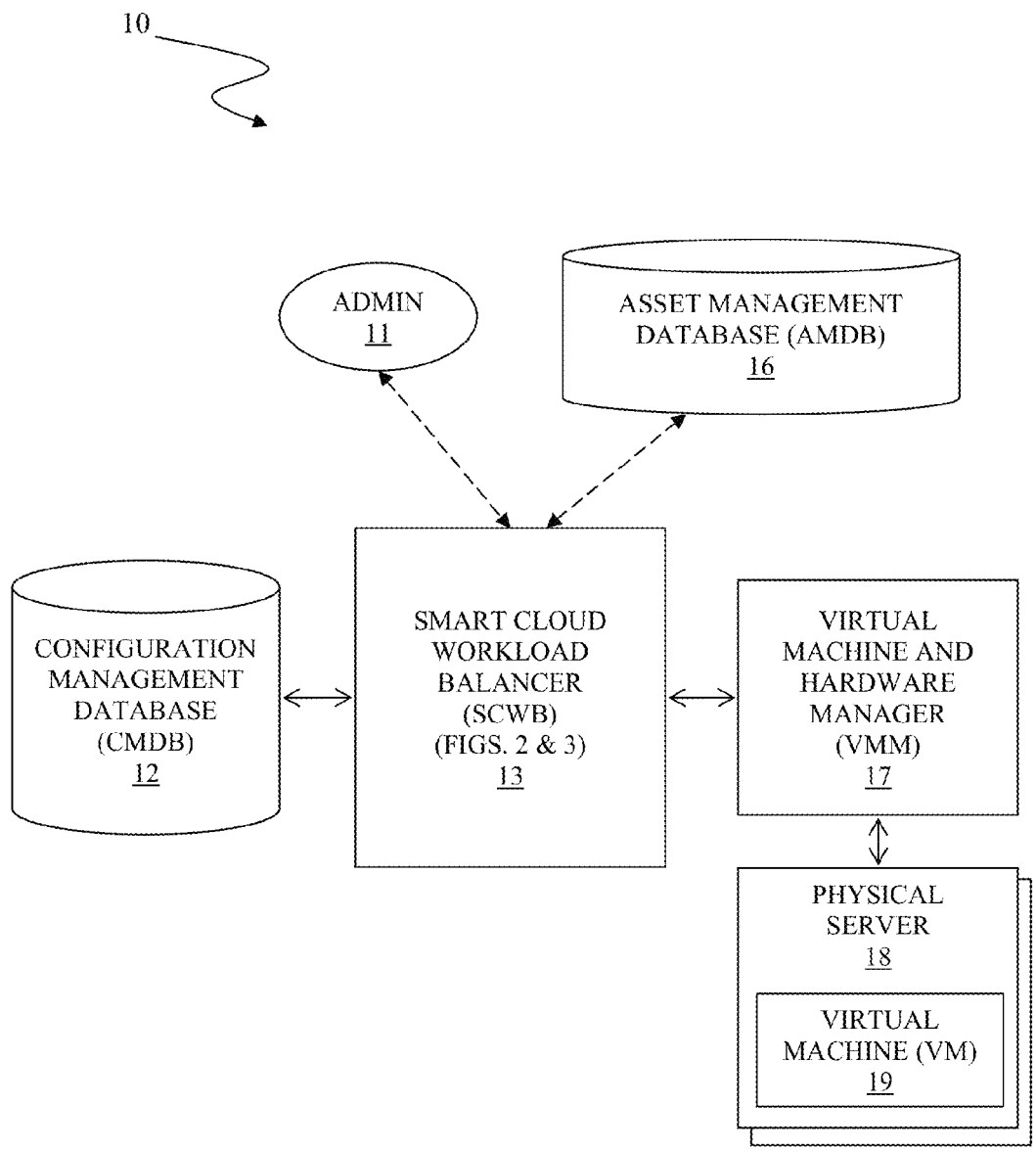
FIG. 1 illustrates a cloud computing system for optimizing workload by dynamically reallocating virtual machines of the cloud computing system, in accordance with embodiments of the present invention.

FIG. 1 illustrates a cloud computing system 10 for optimizing workload by dynamically reallocating virtual machines of the cloud computing system 10, in accordance with embodiments of the present invention.

The cloud computing system 10 comprises an administrator 11, a configuration management database (CMDB) 12, a smart cloud workload balancer (SCWB) 13, an asset management database (AMDB) 16, a virtual machine and hardware manager (VMM) 17, and at least two physical servers. The CMDB 12, the SCWB 13, the AMDB 16, and the VMM 17 run on a respective generic computer system. See descriptions of FIG. 9 infra for details of a generic computer system. An example of the cloud computing system 10 is IBM® Global Technology Services (GTS) infrastructure shared among customers of the IBM GTS, which provides data processing services by use of System x physical servers virtualized by VMware®, and System p physical servers virtualized by PowerVM. (IBM is a registered trademark of International Business Machines Corporation in the United States and other countries; VMware is a registered trademark of VMware, Inc. in the United States and other countries.)

The administrator 11 is a human user configuring and monitoring operations of the cloud computing system 10 by interacting with the SCWB 13. The administrator 11 sets policies controlling the workload balancing, defines costs for operating the cloud computing system 10 as a sum of electrical power usage and software licensing fees, verifies an ensemble status as to virtual machine assignment for respective physical servers, and creates, deletes, and reconfigures virtual machines in respective physical servers. The administrator 11 also receives a performance report in response to a request for the performance report.

The smart cloud workload balancer (SCWB) 13 performs automated workload optimization over virtual machines of the cloud computing system 10 such that the cloud computing system 10 performs given workload with a minimum cost. The SCWB 13 distributes the workload over the virtual machines in a way to minimize the operational costs of the cloud computing system 10 based on technical, availability and software license constraints of the cloud computing system 10. Examples of conventional workload balancing methods in cloud computing systems may be, inter alia, the VMware Distributed Resource Scheduling, the Citrix® Dynamic Workload Balancing, the IBM Systems Director VMControl, etc. (Citrix is a registered trademark of Citrix Systems, Inc. and its affiliates in the United States and other countries.) The SCWB 13 automatically reconfigures workload of the cloud computing system 10 among virtual machines by utilizing dynamic zoning of physical servers based on policy restriction zones and availability zones for workload balancing and by utilizing multiple sources of performance data, a cost model for software license cost, and an automated workload optimizing method based on the performance data and the cost model. In this specification, the term "physical servers availability zone" is defined as a logical group of physical servers that shares one or more external physical components such as power distribution units, datacenter room, rack, network switches, external storage, etc., such that all physical servers in one availability zone operate atomically but not partially available. Also in this specification, the term "physical servers restriction zone" is defined as a dynamic logical group of physical servers within a specific physical server availability zone that represents a logical condition such as, inter alia, a group having license to run a specific software program during a specific time period. See description of FIG. 2, infra, for functional components of the SCWB 13. See description of FIG. 3, infra, for steps performed by the SCWB 13.

The configuration management database (CMDB) 12 stores information about dependencies between said at least one physical server and virtual machines running on respective physical servers and topology information as to virtual machine assignment for respective physical servers. The SCWB 13 updates the CMDB 12 with new topology information resulting from optimization of workload distribution among physical servers. In this specification, terms "VM topology" and "topology information" are used interchangeably.

In another embodiment of the present invention, the cloud computing system 10 further comprises an external integration tool and/or an external cloud automation tool. The external integration tool extends the functions of the SCWB 13 by exchanging various data and metadata such as, inter alia, user directories, billing and accounting data, change management data, service request, etc. The external integration tool interacts with specific components within the SCWB 13. See description of FIG. 2 infra for details of the components interfacing the external integration tool.

In the same embodiment, the external cloud automation tool receives end user requests and automates provisioning of services in the cloud computing system 10. Examples of the external cloud automation tool may be, inter alia, ITSAM®, Eucalyptus™, etc. (ITSAM is a registered trademark of Expetec Corporation in the United States and/or other countries; Eucalyptus is a trademark of Eucalyptus Systems, Inc., in the United States and/or other countries.)

The asset management database (AMDB) 16 stores software asset information regarding a number of available software licenses, a number of installed software licenses, etc. In one embodiment of the present invention, the administrator 16 provides the asset information of the AMDB 16 by interactive input to the SCWB 13, wherein the asset information is not stored in the AMDB 16.

The virtual machine and hardware manager (VMM) 17 monitors and manages said at least two physical servers and virtual machines running on said physical servers. The SCWB 13 interacts with the VMM 17 in receiving performance data of the cloud computing system 10 and electrical power usage information. The SCWB 13 automatically controls VM allocation over physical servers by use of the VMM 17, communicating via, inter alia, hypervisors, VMM application programming interfaces (APIs). The VMM 17 receives requests for virtual operations and physical operations from the SCWB 13 and performs adding, moving, deleting, suspending virtual machines to and from respective physical machines, changing configuration of virtual machine assignment for respective physical servers. Examples of the VMM 17 may be, inter alia, the Hardware Management Console (HMC), the VMware vCenter, the Citrix XenCenter, the IBM System Director, etc.

A physical server 18 of said at least two physical servers is a generic computer system that runs zero or more virtual machines. A virtual machine (VM) 19 of said zero or more virtual machines is a software implementation of a computer system that services a portion of workload of the cloud computing system 10. In servicing the workload, the virtual machine 19 runs various software applications, which is associated with a respective software license cost. Overall software license cost of running the software applications in the cloud computing system 10 is calculated based on a respective number of physical or virtual central processing units (CPUs) in each physical server where a virtual machine that performs a software application is running. In this specification, the terms CPU and processor are used interchangeably.

Figure 2:
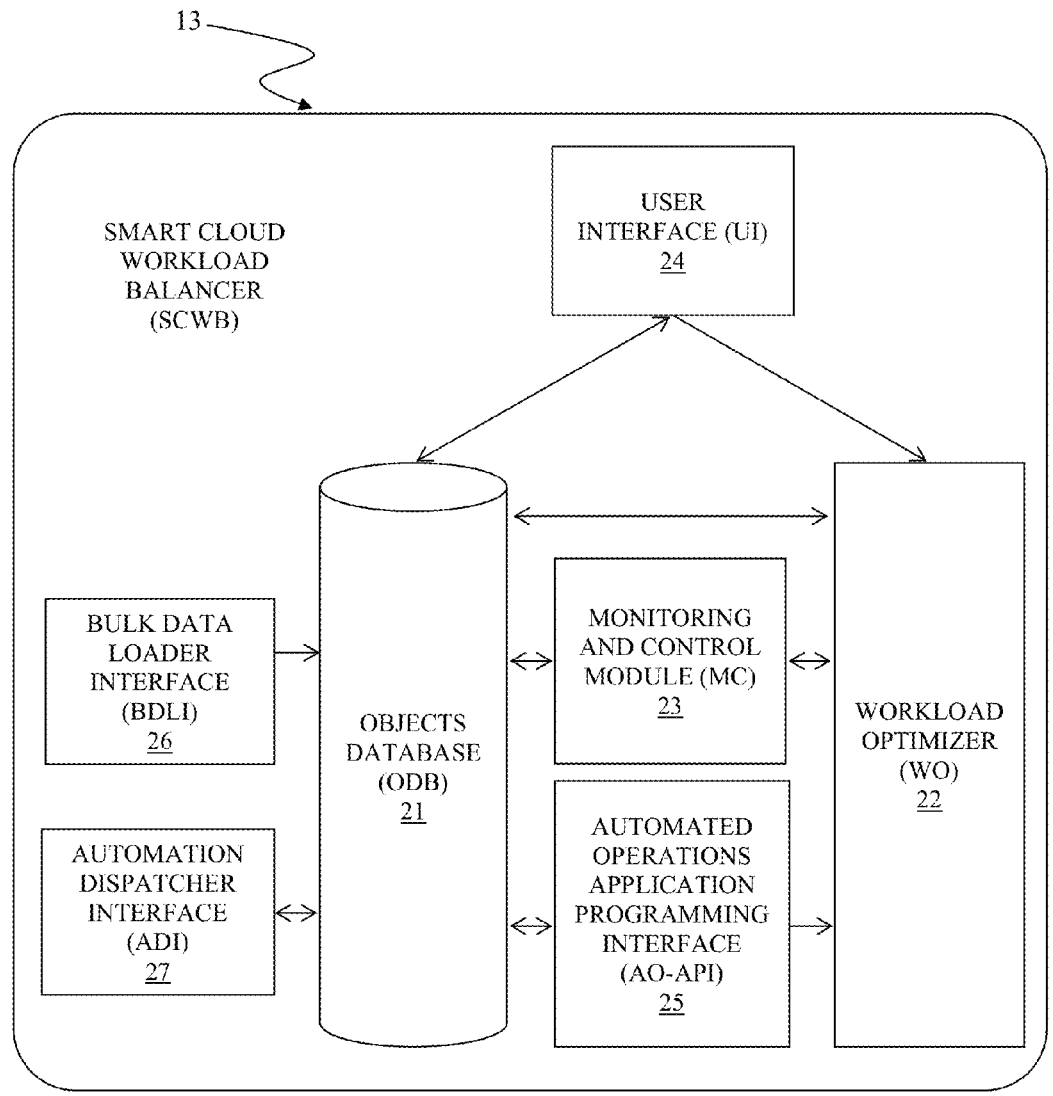
FIG. 2 illustrates functional components of the smart cloud workload balancer (SCWB) in the cloud computing system of FIG. 1, in accordance with the embodiments of the present invention.

FIG. 2 illustrates functional components of the smart cloud workload balancer (SCWB) 13 in the cloud computing system 10 of FIG. 1 supra, in accordance with the embodiments of the present invention.

The SCWB 13 comprises an objects database (ODB) 21, a workload optimizer (WO) 22, a monitoring and control module (MC) 23, a user interface (UI) 24, an automated operations application programming interface (AO-API) 25, a bulk data loader interface (BDLI) 26, and an automation dispatcher interface (ADI) 27.

The objects database (ODB) 21 stores information necessary for workload optimization over virtual machines (VMs) running on physical servers of the cloud computing system as used by the workload optimizer (WO) 22. The information is gathered from various components of the cloud computing system 10 of FIG. 1 supra. In one embodiment of the present invention, the information stored in the ODB 21 comprises policy information, monitoring information, configuration data and asset data.

The policy information indicates various policy data items stored in the ODB, which define workload balancing policies per inputs provided by the administrator of the cloud computing system. Examples of the policy data items may be, inter alia, software asset information regarding a number of available software licenses and a number of installed software licenses as buffered from the AMDB 16 of FIG. 1 supra, thresholds of workload per VM and/or physical server, a range of VM relocation frequency permitted in the cloud computing system, a level of compliance to the software license agreement, software license restrictions, VM business priorities, physical servers restriction zones and physical servers availability zones, physical servers location pools, VM affinity rules and VM anti-affinity rules, hardware constrains and power consumption limits, etc. In this specification, the term "physical servers location pool" is defined as a logical group of physical servers hosted by a same data center or a network such that the SCWB prevents a network congestion that may result from high data traffic required between virtual machines running in remote locations by allocating two virtual machines having high communication requirements in a same physical servers location pool. In this specification, the term "VM affinity rule" is defined as a relationship between two virtual machines that perform better when the two VMs run in a same physical server. In this specification, the term "VM anti-affinity rule" is defined as a relationship between two virtual machines that cannot perform in a same physical server.

The monitoring information indicates various monitoring data items stored in the ODB as collected from the physical servers of the cloud computing system while normal operation processing the workload. Examples of the monitoring data items may be, inter alia, respective electrical power consumption of each physical server, resource utilization information for each physical server and VM, wherein the resource comprises processor, memory, and input/output (I/O) data communication channel bandwidth, etc.

The configuration information indicates various configuration data items stored in the ODB as configured by the administrator and as buffered from the CMDB 12 of FIG. 1 supra. Examples of the configuration data items may be, inter alia, virtual machine (VM) configuration and physical server configuration. The VM configuration specifies, for each VM, a respective capacity and target performance level for resources of each VM, comprising virtual processors, memory, and network. The physical server configuration specifies, for each physical server, a respective number of core processors, a respective amount of memory, CPU performance level relative to other CPU types available in the other physical servers in the cloud computing system, etc.

The workload optimizer (WO) 22 automatically performs workload optimization by use of linear or quadratic programming based on information retrieved from the ODB 21 such that the WO 22 dynamically decides a optimal workload distribution for virtual machines running in the physical servers of the cloud computing system, wherein the workload distribution improves performance of the cloud computing system as well as meets operation criteria of the cloud computing system as specified by the information from the ODB 21. See description of step 400 of FIG. 3 infra and FIGS. 7A-7B infra for detailed operations of the WO 22.

The monitoring and control module (MC) 23 monitors virtual machines and physical servers of the cloud computing system for hardware constraints and system availability data during normal business operation. See description of step 200 of FIG. 3 infra and FIG. 5 infra for detailed operations of the MC 23.

The user interface (UI) 24 enables the administrator of the cloud computing system to interact with the SCWB 13 by providing inputs determining restriction policies and other system configuration information. See description of steps 100 and 500 of FIG. 3 infra for detailed operations of the UI 24.

The automated operations application programming interface (AO-API) 25 is an application programming interface (API) used by the external cloud automation tool and/or the external integration tool to interact with the SCWB for system services provided by other components of the cloud computing system 10 of FIG. 1 supra. Examples of the system services may be, inter alia, creating a new virtual machine in a physical server, delete an existing virtual machine from a physical server, etc. See description of step 100 of FIG. 3 infra for detailed operations of the AO-API 25.

The bulk data loader interface (BDLI) 26 enables database components of the cloud computing system 10 to update the content of the ODB 21. The external integration tool interacts with a bulk data loader interface (BDLI) 26 for data synchronization. See description of step 100 of FIG. 3 infra for detailed operations of the BDLI 26.

The automation dispatcher interface (ADI) 27 enables the virtual machine and hardware manager (VMM) 17 of FIG. 1 supra to interact with the SCWB 13 in provisioning, changing, and removing virtual machines, in provisioning a new physical server, and in shutting down an existing physical server. See description of step 400 of FIG. 3 infra for detailed operations of the ADI 27.

The SCWB 13 of the present invention dynamically optimizes workload distribution of virtual machines (VMs) over physical servers in the cloud computing system such that performing the workload in pursuant to an optimized workload distribution minimizes software license cost of the cloud computing system. To optimize workload distribution, the SCWB 13 takes system information into account in building a software license cost model. See description of the ODB 21 for examples of the system information. The software license cost model may differ based on licensing objectives such as licensing per physical machines, licensing per processors, licensing per cores, licensing by sub-capacity differentiation of software costs by processor type, etc. In one embodiment of the present invention, the software license cost is calculated based on a number of VMs running a software application subject to a respective software license agreement. The SCWB 13 dynamically analyzes the software license cost model and calculates a total cost of cloud computing and generates a new VM topology with minimum total cost subject real-time content of the ODB 21, as described in FIGS. 7A and 7B infra. The SCWB 13 controls management of the cloud computing system, virtual machine assignment and application distribution, interfaces with external data sources and processing components, etc.

Conventional workload optimization methods that use static planning for optimization are either ineffective or expensive. The cloud computing system needs to acquire software licenses for all physical servers in a resource pool to run a specific software application. Including all physical servers in the resource pool is not cost effective in terms of the software license cost since not all physical servers need to run the software application at all time. To reduce the software license cost, the cloud computing system may limit a number of physical servers in the resource pool by excluding certain physical servers from the resource pool, which limits flexible virtual machine reallocation of the cloud computing system because virtual machines running the software application cannot be allocated on the physical servers that is excluded from the resource pool. In contrast, the workload optimization of the present invention dynamically reallocates any virtual machine to any physical server, which provides flexible and cost-effective workload optimization.

Figure 3:
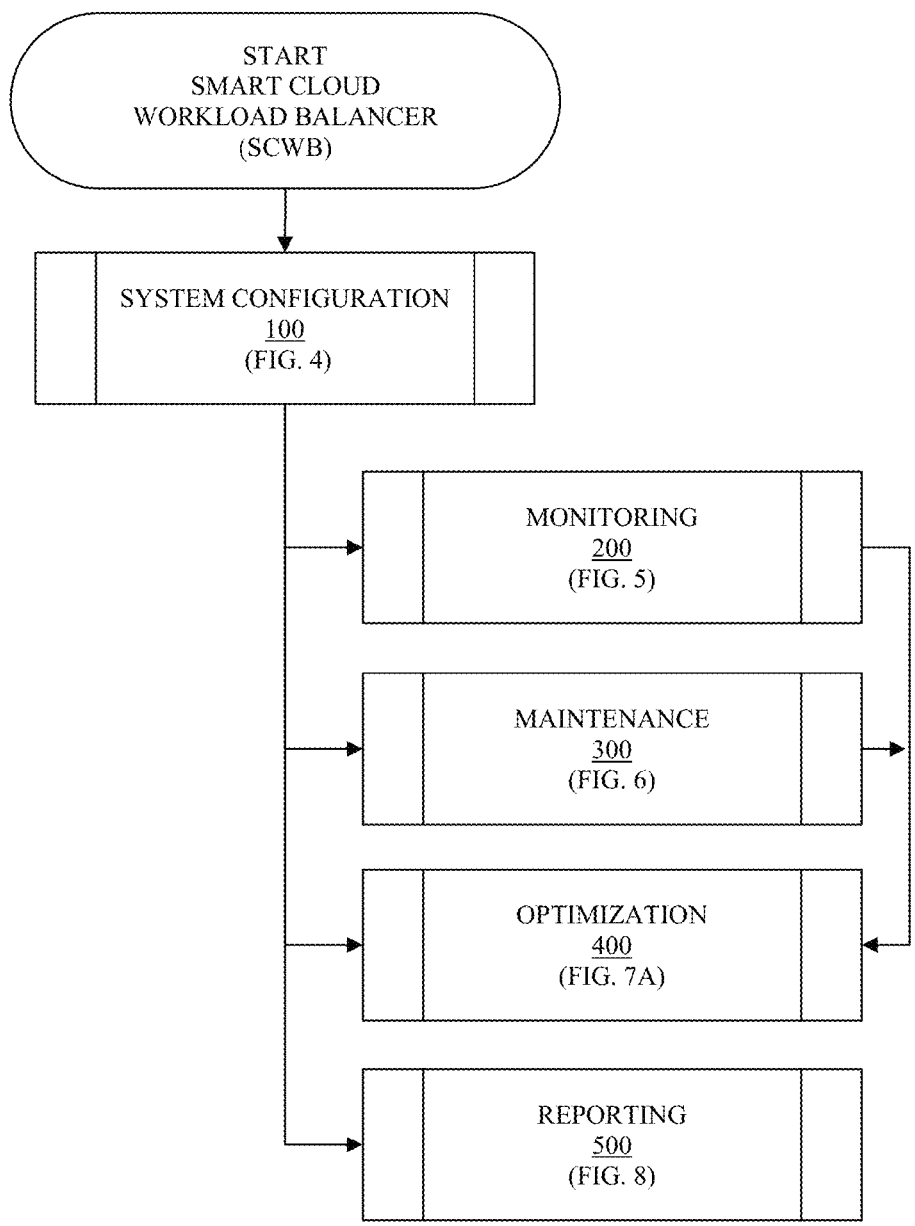
FIG. 3 is a flowchart depicting a method for optimizing workload by dynamically reallocating virtual machines of the cloud computing system, which is performed by the smart cloud workload balancer (SCWB) 13 of FIG. 1, in accordance with the embodiments of the present invention.

FIG. 3 is a flowchart depicting a method for optimizing workload by dynamically reallocating virtual machines of the cloud computing system 10 of FIG. 1 supra, which is performed by the smart cloud workload balancer (SCWB) 13 of FIG. 1, supra, in accordance with the embodiments of the present invention.

In step 100, the SCWB configures the cloud computing system for production/normal operation by use of a first group of functional blocks comprising the user interface (UI) 24, automated operations application programming interface (AO-API) 25, and the bulk data loader interface (BDLI) 26 of FIG. 2 supra. In this specification, the first group of functional blocks in the SCWB is referred to as a system configuration module. See description of FIG. 4, infra, for details of steps performed by the system configuration module for system configuration. After step 100 is completed, the cloud computing system starts production/normal operation, and the SCWB performs steps 200, 300, 400 and 500, concurrently with the production/normal operation, which are respectively associated with either a human trigger provided by the administrator or an automatic trigger given by the cloud computing system.

In step 200, the SCWB monitors performance of the cloud computing system by use of the monitoring and control module (MC) 23 of FIG. 2 supra, and updates content of the ODB with the monitored performance data. See description of FIG. 5, infra, for details of steps performed by the MC for monitoring performance of the cloud computing system.

In step 300, the SCWB performs maintenance operations for the cloud computing system by use of a second group of functional blocks comprising the monitoring and control module (MC) 23 and the automation dispatcher interface (ADI) 27 of FIG. 2 supra. In this specification, the second group of functional blocks in the SCWB is referred to as a maintenance module. See description of FIG. 6, infra, for details of steps performed by the maintenance module for maintenance of the cloud computing system.

In step 400, the SCWB optimizes workload of virtual machines within the cloud computing system by use of the workload optimizer (WO) 22 of FIG. 2 supra. See description of FIG. 7A, infra, for details of steps performed for workload optimization.

In step 500, the SCWB reports performance of the cloud computing system based on user request by use of the UI 24 of FIG. 2 supra. See description of FIG. 8, infra, for details of steps performed for reporting of the cloud computing system.

Figure 4:
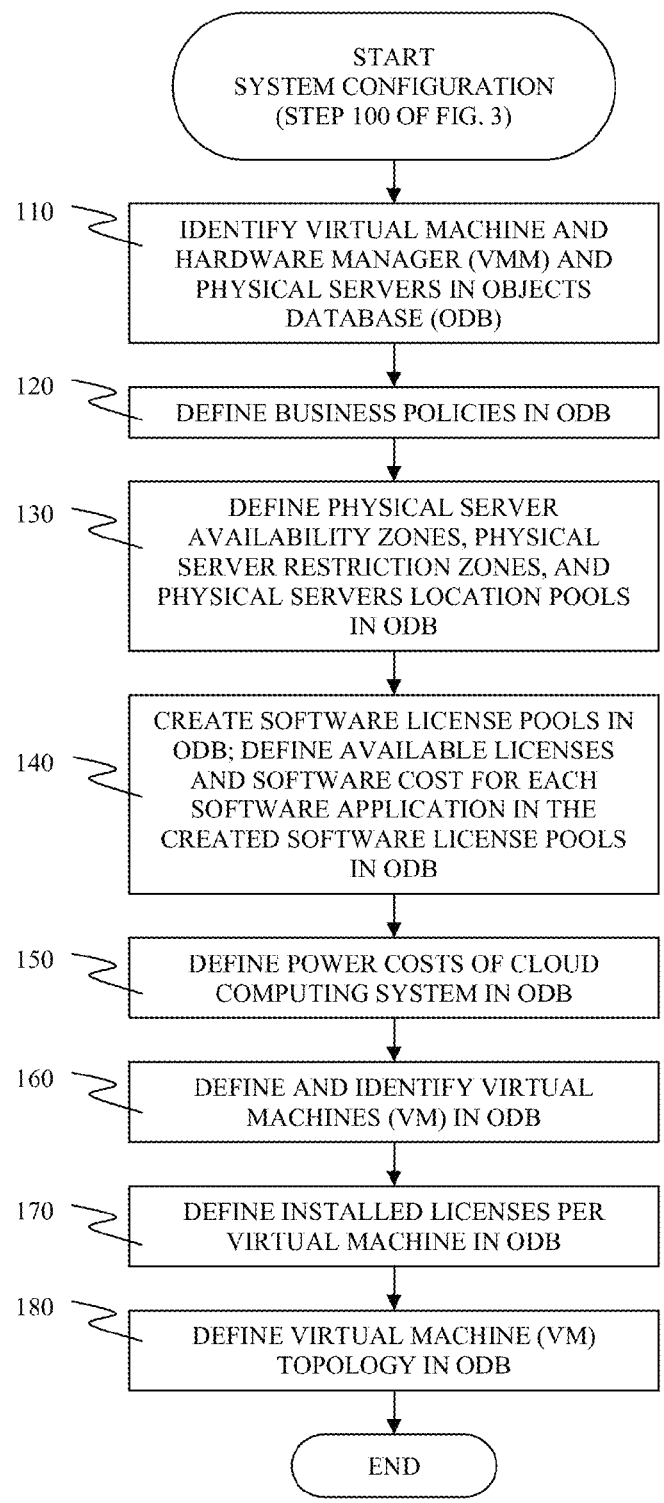
FIG. 4 is a flowchart depicting system configuration substeps performed in place of step 100 of FIG. 3 by the system configuration module of the smart cloud workload balancer (SCWB), in accordance with the embodiments of the present invention.

FIG. 4 is a flowchart depicting system configuration substeps performed in place of step 100 of FIG. 3 supra by the system configuration module of the smart cloud workload balancer (SCWB), in accordance with the embodiments of the present invention.

In step 110, the system configuration module identifies virtual machine and hardware manager (VMM) and physical servers of the cloud computing system according to inputs provided by the administrator. The system configuration module subsequently updates data items corresponding to the VMM and physical servers stored in the object database (ODB). Then the system configuration module proceeds with step 120.

In step 120, the system configuration module defines business policies of the cloud computing system according to inputs provided by the administrator and updates data items corresponding to the business policies of the ODB. Examples of business policies may be, inter alia, thresholds of virtual machine move frequency, etc. Then the system configuration module proceeds with step 130.

In step 130, the system configuration module defines physical server availability zones, physical servers restriction zones, and physical servers location pools according to inputs provided by the administrator and updates respective data items corresponding to the physical server availability zones, physical servers restriction zones, and physical servers location pools of the ODB. Each physical server in the cloud computing system participates in one availability zone and at least one restriction zone. Allocating a virtual machine in a physical server included in a restriction zone of said at least one restriction zone is dynamically managed by the SCWB. Each software license constraint is implemented as a respective restrict zone. Multiple restriction zones may exist within a single availability zone. Then the system configuration module proceeds with step 140.

In step 140, the system configuration module creates software license pools, and respectively defines available licenses and software license cost for each software application within the software license pools according to inputs provided by the administrator. The system configuration module subsequently updates data items respectively corresponding to the created software license pools, defined available licenses and software license cost as stored in the object database (ODB). Then the system configuration module proceeds with step 150.

In step 150, the system configuration module defines power cost of the cloud computing system according to inputs provided by the administrator, which is defined as a sum of respective electrical power cost for all physical servers of the cloud computing system. The system configuration module subsequently updates a data item corresponding to the defined power cost in the ODB. Then the system configuration module proceeds with step 160.

In step 160, the system configuration module defines and identifies virtual machines (VM) of the cloud computing system according to inputs provided by the administrator. The system configuration module subsequently updates data items respectively corresponding to each VM in the ODB. Then the system configuration module proceeds with step 170.

In step 170, the system configuration module defines installed licenses per virtual machine (VM) according to inputs provided by the administrator. The system configuration module subsequently updates data items respectively corresponding to installed license number for each VM in the ODB. Then the system configuration module proceeds with step 180.

In step 180, the system configuration module defines a VM topology, which specifies a respective mapping between each VM and an associated physical machine in which each VM is running according to inputs provided by the administrator. The VM topology is also determined by VM affinity rules and VM anti-affinity rules. The VM affinity rules define groups of virtual machines that may be allocated in a same physical server, and the VM anti-affinity rules define groups of virtual machines that should not be allocated in a same physical server. The system configuration module subsequently updates a data item corresponding to the defined VM topology in the ODB. Then the system configuration module terminates as completing system configuration, and the cloud computing system starts production/normal operation. The SCWB proceeds with at least one step selected from steps 200, 300, 400 and 500 according to inputs provided by the administrator.

Figure 5:
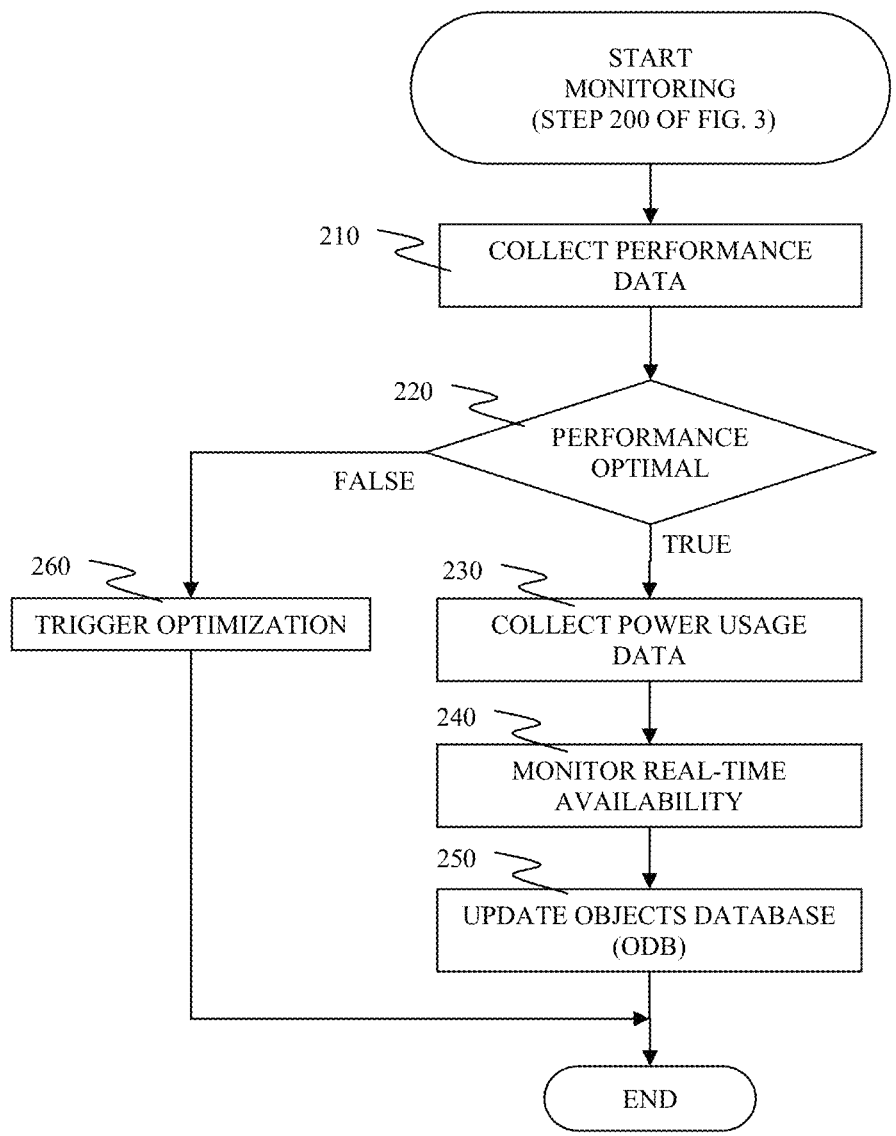
FIG. 5 is a flowchart depicting monitoring substeps performed in place of step 200 of FIG. 3 by the monitoring and control module (MC) of the smart cloud workload balancer (SCWB), in accordance with the embodiments of the present invention.

FIG. 5 is a flowchart depicting monitoring substeps performed in place of step 200 of FIG. 3 supra by the monitoring and control module (MC) of the smart cloud workload balancer (SCWB), in accordance with the embodiments of the present invention.

The MC performs steps 210 through 260 described below for each monitoring cycle predetermined by the administrator.

In step 210, the MC collects performance data from virtual machines and/or physical servers as the virtual machines process workloads of the cloud computing system during the production/normal operation. Then the MC proceeds with step 220.

In step 220, the MC determines whether the cloud computing system performs optimally based on the performance data collected in step 210. If the MC determines that the cloud computing system performs optimally, then the MC proceeds with step 230 for further monitoring. If the MC determines that the cloud computing system does not perform optimally, then the MC proceeds with step 260. Wherein the performance data from step 210 indicates that the cloud computing system reaches a peak usage of any physical server of that there exist a failed physical server, the MC determines that the cloud computing system does not perform optimally and needs optimization.

In step 230, the MC collects power usage data from each physical server in the cloud computing system during the production/normal operation. Then the MC proceeds with step 240.

In step 240, the MC monitors real-time availability of the virtual machines and the physical servers. Then the MC proceeds with step 250.

In step 250, the MC updates objects database (ODB) with data collected in steps 230 and 240. Then the MC terminates a cycle of monitoring.

In step 260, the MC triggers workload optimization by invoking the workload optimizer (WO), step 400 of FIG. 3 supra. Then the MC terminates a cycle of monitoring.

Figure 6:
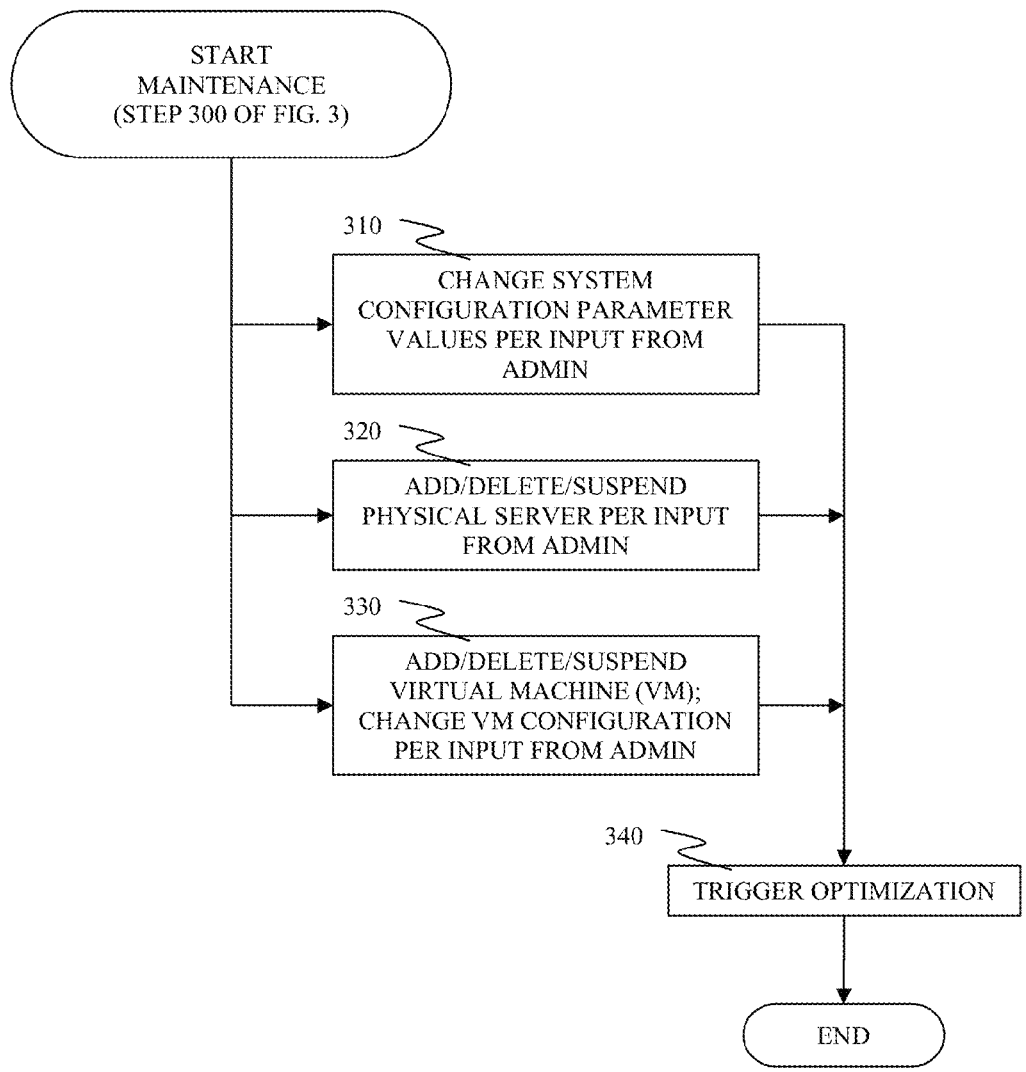
FIG. 6 is a flowchart depicting maintenance substeps performed in place of step 300 of FIG. 3 by the maintenance module of the smart cloud workload balancer (SCWB) in accordance with the embodiments of the present invention.

FIG. 6 is a flowchart depicting maintenance substeps performed in place of step 300 of FIG. 3 supra by the maintenance module of the smart cloud workload balancer (SCWB) in accordance with the embodiments of the present invention.

In step 310, the maintenance module changes system/VM configuration parameter values stored in the ODB according to inputs provided by the administrator. See descriptions of the ODB in FIG. 2 supra for specific data items comprising the system configuration parameter. Then the management module proceeds with step 340.

In step 320, the maintenance module manages physical server according to a physical server management operation provided by the administrator, by interacting with the virtual machine and hardware manager (VMM) of the cloud computing system. A value of the physical server management operation is selected from {add, delete, suspend}, wherein add operation adds a new physical server to a current pool of physical servers and subsequently marks the added physical server as available for running virtual machines, wherein delete operation removes a physical server from the pool and subsequently turns the removed physical server off, and wherein suspend operation temporarily turns off a physical server and marks the physical server as unavailable for running virtual machines. The physical server management operations result in updating the ODB. Then the management module proceeds with step 340.

In step 330, the maintenance module manages virtual machines (VMs) according to a VM management operation provided by the administrator, by interacting with the virtual machine and hardware manager (VMM) of the cloud computing system. A value of the VM management operation is selected from {add, delete, suspend}, wherein add operation instantiates a new virtual machine in a physical server and subsequently marks the new virtual machine as available for running a software application, wherein delete operation removes a virtual machine from a pool of virtual machines, and wherein suspend operation temporarily put a virtual machine in a suspended state such that the virtual machine does not consume any resources, neither the software licenses nor physical resources. The VM management operations result in updating the ODB. Then the management module proceeds with step 340.

In step 340, the maintenance module triggers workload optimization by invoking the workload optimizer (WO). Then the maintenance module terminates and the SCWB proceeds with the WO performing step 400 of FIG. 3 supra.

Figure 7A:
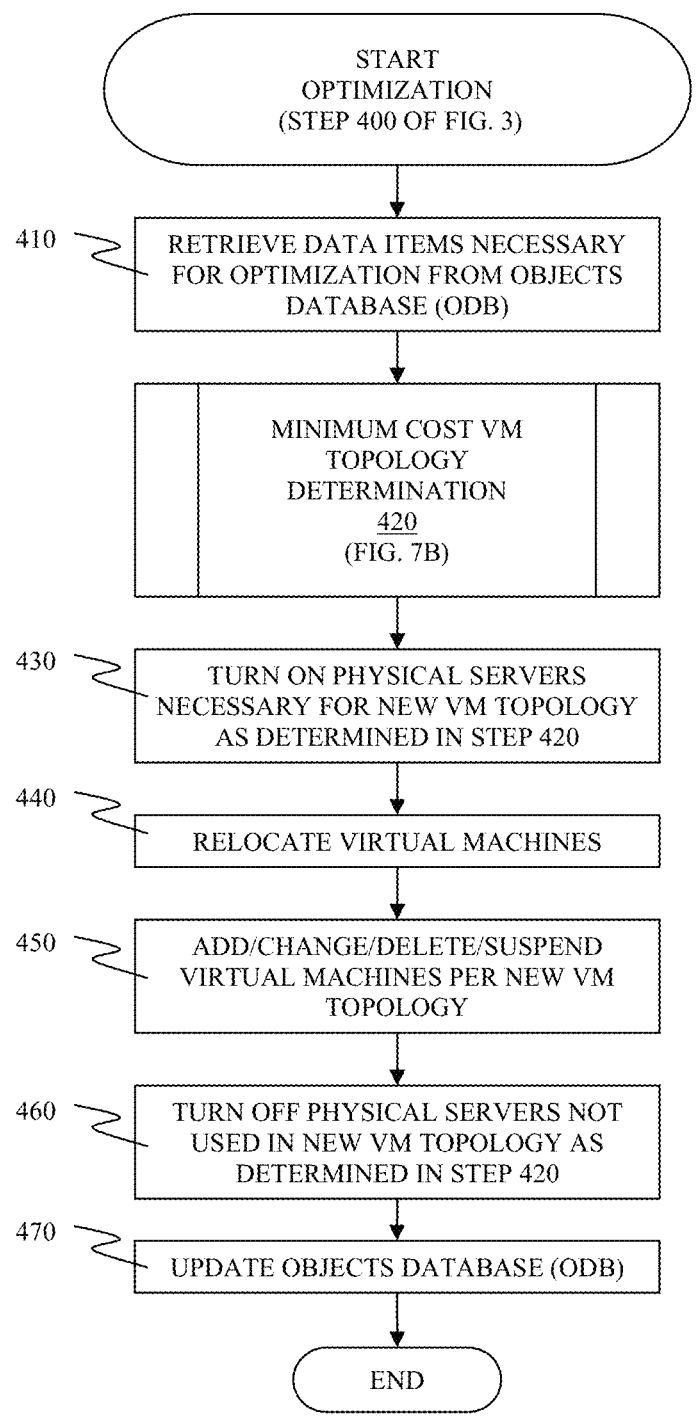
FIG. 7A is a flowchart depicting optimization substeps performed in place of step 400 of FIG. 3 by the workload optimizer (WO) of the smart cloud workload balancer (SCWB) in accordance with the embodiments of the present invention.

FIG. 7A is a flowchart depicting optimization substeps performed in place of step 400 of FIG. 3 supra by the workload optimizer (WO) of the smart cloud workload balancer (SCWB) in accordance with the embodiments of the present invention.

In step 410, the WO retrieves data items necessary for optimization from the objects database (ODB). Then the WO proceeds with step 420.

In step 420, the WO determines a new VM topology by calculating minimum total cost and minimum number of VM relocation. In one embodiment of the present invention, the WO employs two-phase calculation using quadratic programming (QP) enabled solvers. See description of FIG. 7B infra for steps performed in determining the new VM topology. Then the WO proceeds with step 430.

In step 430, the WO turns on physical servers necessary for the new VM topology as determined in step 420 supra. Then the WO proceeds with step 440.

In step 440, the WO relocates virtual machines (VM) among physical servers pursuant to the new VM topology. Then the WO proceeds with step 450.

In step 450, the WO adjusts status information of relocated VMs pursuant to the new VM topology by use of a respective VM management operation selected from {add, delete, suspend}. Then the WO proceeds with step 460.

In step 460, the WO turns off physical servers not used for virtual machines in the new VM topology. Then the WO proceeds with step 470.

In step 470, the WO updates the ODB with data items reflecting the new VM topology. Then the WO terminates a cycle of workload optimization, and the cloud computing system continues workload production pursuant to the new VM topology.

Figure 7B:
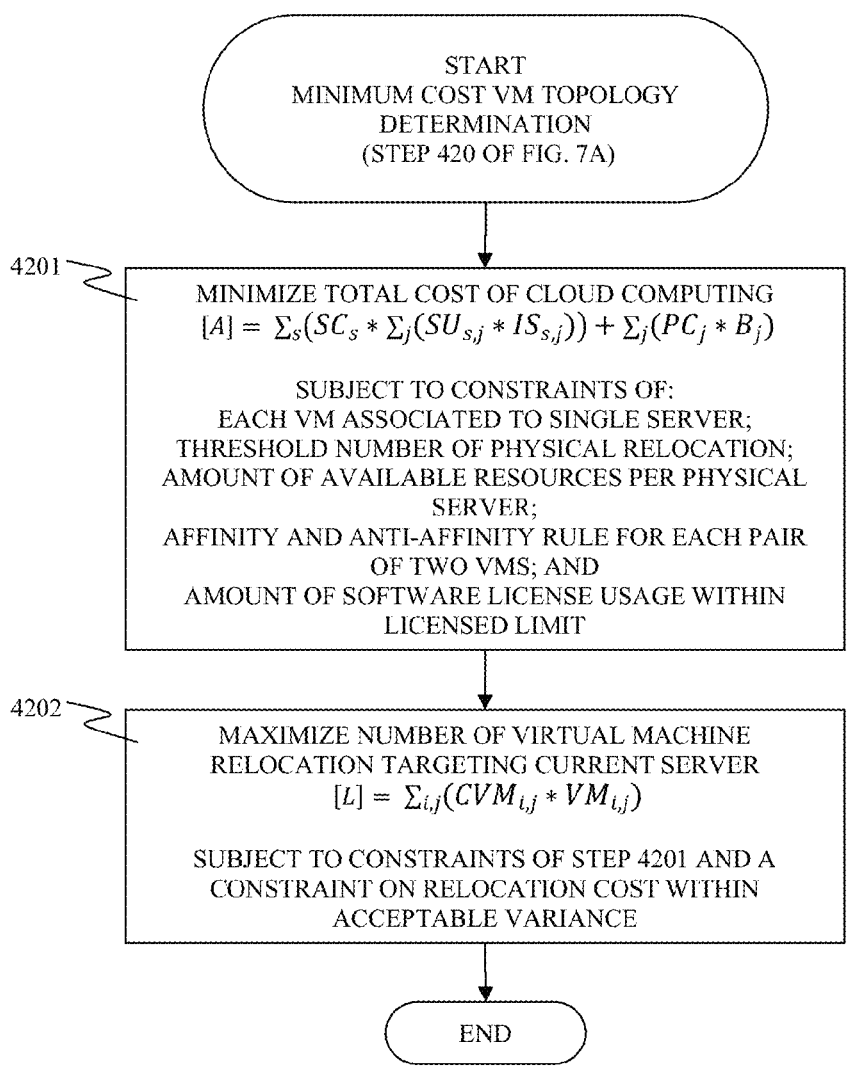
FIG. 7B is a flowchart depicting cost minimization substeps performed in place of step 420 of FIG. 7A by the workload optimizer (WO) of the smart cloud workload balancer (SCWB), in accordance with the embodiments of the present invention.

FIG. 7B is a flowchart depicting cost minimization substeps performed in place of step 420 of FIG. 7A supra by the workload optimizer (WO) of the smart cloud workload balancer (SCWB), in accordance with the embodiments of the present invention.

The workload optimizer (WO) performs steps 4201 and 4202 based on data retrieved from the object database (ODB) of the SCWB. Step 4201 and step 4202 is mathematically modeled by use of mathematical optimization techniques such as quadratic programming (QP) and quadratically constrained quadratic program (QCQP), which is implemented by use of a QP and QCQP enabled solver.

In step 4201, the WO minimizes a total cost of cloud computing (TC) for all software running on VMs on each physical servers, as a first phase of the two-phase VM topology calculation, subject to constraints comprising: each VM being associated to only one physical server; a threshold limiting the number of physical relocation; the amount of available resources per physical server; affinity and anti-affinity rule for each pair of two VMs; and amount of software license usage within licensed limit. In the first phase of step 4201, the WO discovers a minimum total cost (TC) without limiting a total number of VM relocations. Then the WO proceeds with step 4202 for a second phase of the two-phase VM topology calculation.

The objective function of the total cost (TC), as a sum of software cost for all running software and electrical power cost for all running physical servers, is formulated as Formula [A].

$$\Sigma_s(SC_s * \Sigma_j(SU_{s,j} * IS_{s,j})) + \Sigma_j(PC_j * B_j) \quad [A]$$

wherein $SC_S$ is a respectively predefined unit cost for each software (s), wherein $SU_{s,j}$ is a respectively predefined number of software units required to run s-th software (s) in j-th physical server, wherein $IS_{s,j}$ is a first binary variable that has value one (1) if there exist a VM that runs s-th software (s) in j-th physical server, and that has value zero (0) if there is no such VM, wherein $PC_j$ isa respective constant describing electrical power cost of j-th physical server, and wherein $B_j$ is a second binary variable that has value one (1) if j-th physical server is turned on, and that has value zero (0) if j-th physical server is turned off.

The constraints of the total cost (TC) are formulated as Formulae [B], [C], [D], [E], [F], [G], [H], [I], [J], and [K], respectively, as below.

Formula [B] is a first group of constraints and is defined for each i-th VM. It indicates that i-th virtual machine (VM) is associated with j-th physical server, ensuring that each VM is associated with exactly one physical server within the cloud computing system.

$$\Sigma_j KVM_{i,j} * VM_{i,j} * B_j = 1 \quad [B]$$

wherein $KVM_{i,j}$ is a third binary parameter representing whether or not j-th physical server enables i-th VM to run that has value one (1) if i-th VM can run on j-th physical server, and that has value zero (0) if i-th VM cannot run on j-th physical server such that a group of physical servers having value one (1) for KVM parameter comprise a physical server availability zone with respect to i-th VM, wherein $VM_{i,j}$ is a fourth binary variable that has value one (1) if i-th VM will run on j-th physical server after workload optimization, and that has value zero (0) if i-th VM will not run on j-th physical server after workload optimization, and wherein $B_j$ is the second binary variable that has value one (1) if j-th physical server is turned on, and that has value zero (0) if j-th physical server is turned off as defined in Formula [A] supra.

Formula [C] is a second group of constraints that is defined respective to i-th VM, which represents a predefined threshold for a number of physical server relocation in one optimization cycle.

$$RVM_i + (1 - \Sigma_j(CVM_{i,j} * VM_{i,j})) \le MRVM_i \quad [C]$$

wherein $RVM_i$ is a parameter representing a number of relocations i-th VM had gone through in current optimization cycle, wherein $CVM_{i,j}$ is a binary parameter that has value one (1) if i-th VM currently runs on j-th physical server, and that has value zero (0) if i-th VM does not currently run on j-th physical server, wherein $VM_{i,j}$ is the fourth binary variable that has value one (1) if i-th VM will run on j-th physical server after workload optimization, and that has value zero (0) if i-th VM will not run on j-th physical server after workload optimization, as defined in Formula [B] supra, and wherein $MRVM_i$ is a predefined maximum number of relocations allowed for i-th VM in a current optimization cycle.

Formula [D] is a third group of constraints defined for a respective physical server to ensure amount of memory in the respective physical server is sufficient to run all virtual machines assigned to the respective physical server after optimization.

$$\Sigma_i(VM_{i,j} * M_i) \le BM_j \quad [D]$$

wherein $VM_{i,j}$ is the fourth binary variable that has value one (1) if i-th VM will run on j-th physical server after workload optimization, and that has value zero (0) if i-th VM will not run on j-th physical server after workload optimization as defined in Formula [B] supra, wherein $M_i$ indicates amount of memory required for i-th VM, and wherein $BM_j$ indicates maximum amount of memory usable in j-th physical server.

Formula [E] is a fourth group of constraints defined for a respective physical server to ensure a number of CPU in the respective physical server is sufficient to run all virtual machines assigned to the respective physical server after optimization.

$$\Sigma_i(VM_{i,j} * C_i) \le BC_j \quad [E]$$

wherein $VM_{i,j}$ is the binary variable that has value one (1) if i-th VM will run on j-th physical server after workload optimization, and that has value zero (0) if i-th VM will not run on j-th physical server after workload optimization as defined in Formula [B] supra, wherein $C_i$ indicates an amount of CPU capacity/processing power required for i-th VM running in j-th physical server, and wherein $BC_j$ indicates a maximum amount of CPU capacity/processing power usable in j-th physical server.

Formula [F] is a fifth group of constraints defined for a respective physical server to ensure input/output (I/O) capacity in the respective physical server is sufficient to run all virtual machines assigned to the respective physical server after optimization.

$$\Sigma_i(VM_{i,j} * IO_i) \leq BIO_j \qquad [F]$$

wherein $VM_{i,j}$ is the fourth binary variable that has value one (1) if i-th VM will run on j-th physical server after workload optimization, and that has value zero (0) if i-th VM will not run on j-th physical server after workload optimization as defined in Formula [B] supra, wherein $IO_i$ indicates a respective I/O capacity required for i-th VM running in j-th physical server, and wherein $BIO_j$ indicates maximum I/O capacity usable in j-th physical server.

Formula [G] is a sixth group of constraints, defined for each pair of virtual machines that have predefined affinity rules stored in the ODB, to force that said pair of two virtual machines ($VM_a$ and $VM_b$) having the predefined affinity rules run in a same physical server.

$$\Sigma_j(VM_{a,j} * VM_{b,j}) = 1 \qquad [G]$$

wherein $VM_{a,j}$ indicates a first virtual machine ($VM_a$) running on j-th physical server, and $VM_{b,j}$ indicates a second virtual machine ($VM_b$) running on j-th physical server as defined in Formula [B] supra.

Formula [H] is a seventh group of constraints, defined for each pair of virtual machines that have predefined anti-affinity rules stored in the ODB, to avoid that said each pair of virtual machines having the predefined anti-affinity rules run in a same physical server.

$$\Sigma_j(VM_{a,j} * VM_{b,j}) = 0 \qquad [H]$$

wherein $VM_{a,j}$ indicates the first virtual machine ($VM_a$) running on j-th physical server, and $VM_{b,j}$ indicates the second virtual machine ($VM_b$) running on j-th physical server, as defined in Formula [B] supra.

Formulae [I], [J] and [K] are an eighth group of constraints defined for each software to ensure that software licenses are used in compliance with a software license policy respectively associated with each software application.

$$\Sigma_j(IS_{s,j} * SU_{s,j}) \leq L_s * (1 + LCP_s) \qquad [I]$$

$$\Sigma_i(VM_{i,j} * SVM_{i,s}) \leq BigK * IS_{s,j} \qquad [J]$$

$$IS_{s,j} \leq \Sigma_i(VM_{i,j} * SVM_{i,s}) \qquad [K]$$

wherein $IS_{s,j}$ the first binary variable that has value one (1) if there exist a VM that runs s-th software (s) in j-th physical server, and that has value zero (0) if there is no such VM, as defined in Formula [A] supra, wherein $SU_{s,j}$ is a parameter indicating a number of software units required to run s-th software (s) in j-th physical server, as defined in Formula [A] supra, wherein $L_s$ indicates a respective total number of available software license units for s-th software (s), and wherein $LCP_s$ is a parameter that has value zero (0) if the software license agreement is strictly followed and the administrator does not permit additional number of software license units than the current total number of available license units, and that has value larger than zero (>0) if the administrator may authorizes to use more software licenses than the current total number of available license units for s-th software (s)

In Formula [J], $VM_{i,j}$ is the fourth binary variable that has value one (1) if i-th VM will run on j-th physical server after workload optimization, and that has value zero (0) if i-th VM will not run on j-th physical server after workload optimization, as defined in Formula [B] supra, $SVM_{i,s}$ is a seventh binary parameter that has value one (1) if i-th VM requires s-th software (s) and that has value zero (0) if i-th VM does not require s-th software, and BigK indicates a constant very larger than estimated number of software licenses required.

In step 4202, the WO maximizes a number of virtual machines that are not relocated from a current physical server after the workload optimization, as the second phase of the two-phase VM topology calculation. In the second phase, the WO searches for a minimum number of relocations when taking the TC calculated from the first phase of step 4201 into account. Then the WO terminates the second phase of the two-phase VM topology calculation, and proceeds with step 430 of FIG. 7A, supra.

The objective function of the second phase is:

$$\Sigma_{i,j}(CVM_{i,j} * VM_{i,j}) \qquad [L]$$

wherein $CVM_{i,j}$ is the fifth binary variable that has value one (1) if i-th VM currently runs on j-th physical server, and that has value zero (0) if i-th VM does not currently run on j-th physical server, as defined in Formula [C] supra, and wherein $VM_{i,j}$ is the fourth binary variable that has value one (1) if i-th VM will run on j-th physical server after workload optimization, and that has value zero (0) if i-th VM will not run on j-th physical server after workload optimization, as defined in Formula [B] supra, subject to the same constraints from step 4201 and another constraint on acceptable range of relocation cost.

Formula [M] is another constraint of the second phase to ensure that a new total cost does not significantly vary from the TC calculated in the first phase of step 4201 pursuant to Formula [A].

$$\Sigma_s(SC_s * \Sigma_j(SU_{s,j} * IS_{s,j})) + \Sigma_j(PC_j * B_j) \leq TC * (1 + ACV) \qquad [M]$$

wherein TC is the total cost calculated in step 4201 and wherein ACV indicates a predefined number representing acceptable cost variance over the optimized total cost. Note that the left term of Formula [M] is distinctive from TC calculated in the first phase by Formula [A] because the WO uses the new objective function represented by Formula [L] in step 4202 to minimize a number of relocations the new VM topology for workload optimization.

Figure 8:
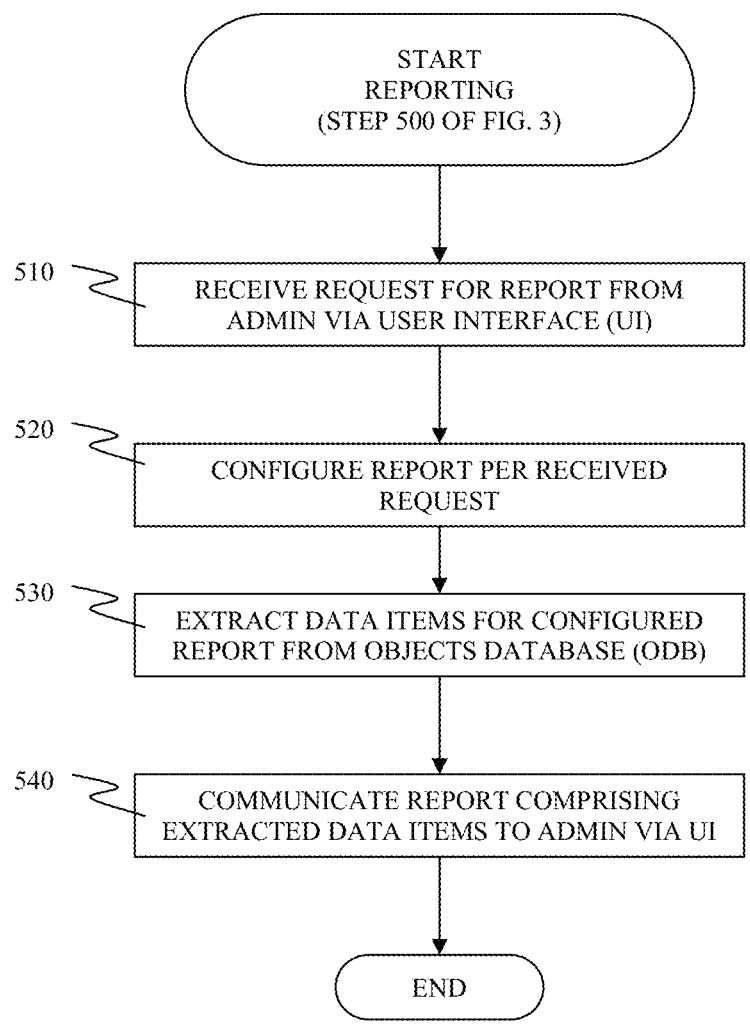
FIG. 8 is a flowchart depicting reporting substeps performed in place of step 500 of FIG. 3 by the smart cloud workload balancer (SCWB) in accordance with the embodiments of the present invention.

FIG. 8 is a flowchart depicting reporting substeps performed in place of step 500 of FIG. 3 supra by the smart cloud workload balancer (SCWB) in accordance with the embodiments of the present invention.

In step 510, the WO receives a request for report from the admin via the User interface (UI). Then the WO proceeds with step 520.

In step 520, the WO configures a report based on the received request from step 510. Then the WO proceeds with step 530.

In step 530, the WO extracts data items necessary for the configured report from objects database (ODB) and subsequently generated the configured report. Then the WO proceeds with step 540.

In step 540, the WO communicates the generated report comprising extracted data items to the admin via the UI. Then the WO terminates reporting and the SCWB proceeds with the WO performing another cycle of optimization.

Figure 9:
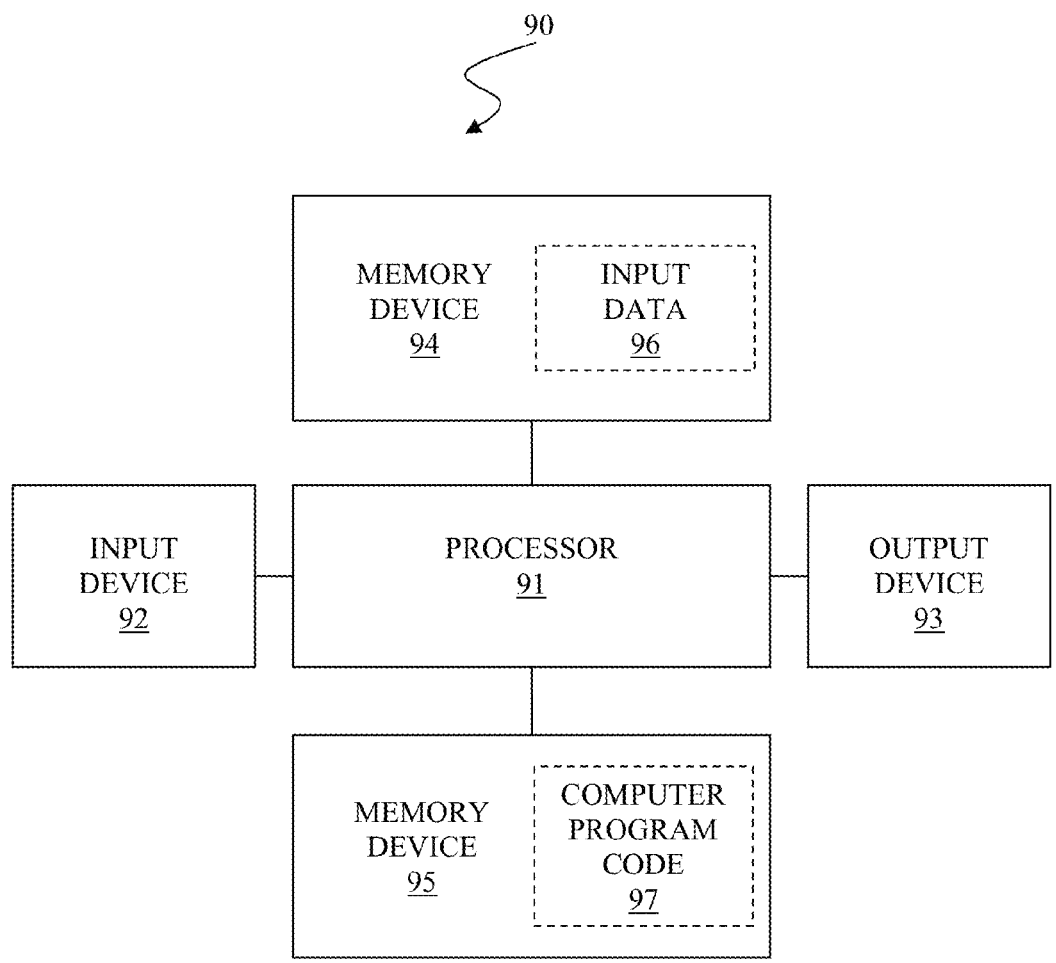
FIG. 9 illustrates a computer system used for optimally balancing workload among at least two physical servers of the cloud computing system, in accordance with the embodiments of the present invention.

FIG. 9 illustrates a computer system 90 used for optimizing workload by dynamically reallocating virtual machines of a cloud computing system, in accordance with the embodiments of the present invention.

The computer system 90 comprises a processor 91, an input device 92 coupled to the processor 91, an output device 93 coupled to the processor 91, and memory devices 94 and 95 each coupled to the processor 91. In this specification, the computer system 90 represents any type of programmable data processing apparatus.

The input device 92 is utilized to receive input data 96 into the computer system 90. The input device 92 may be, inter alia, a keyboard, a mouse, a keypad, a touch screen, a scanner, a voice recognition device, a sensor, a network interface card (NIC), a Voice/video over Internet Protocol (VOIP) adapter, a wireless adapter, a telephone adapter, a dedicated circuit adapter, etc. The output device 93 is utilized to communicate results generated by the computer program code 97 to a user of the computer system 90. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

Any of the components of the present invention can be deployed, managed, serviced, etc. by a service provider that offers to deploy or integrate computing infrastructure with respect to a process for optimizing workload by dynamically reallocating virtual machines of the cloud computing system of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for optimizing workload by dynamically reallocating virtual machines of the cloud computing system.

In another embodiment, the invention provides a method that performs the process steps of the invention on a subscription, advertising and/or fee basis. That is, a service provider, such as a Solution Integrator, can offer to create, maintain, support, etc., a process for optimizing workload by dynamically reallocating virtual machines of the cloud computing system of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. In this specification, the term "memory device" 94, 95 represent a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code 97 for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer program code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer program code" 97 in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for dynamically optimizing workload of a cloud computing system, said method comprising:

configuring, by a processor of a computer system using a smart cloud workload balancer (SCWB), the cloud computing system into an operative status by defining a virtual machine (VM) topology representing a respective virtual machine assignment for each physical server of the cloud computing system, wherein the cloud computing system services a workload of the cloud computing system by use of the VM topology, and wherein the cloud computing system comprises an objects database (ODB) storing system configuration parameters comprising: business policies, a respective software cost per software application in one or more software license pools, a power cost of the cloud computing system, and at least one virtual machine (VM); and determining, by the processor, that the cloud computing system does not perform optimally with respect to a total cost of the cloud computing system, wherein said total cost is a sum of the respective software cost and the power cost; and redistributing, by the processor, the workload of the cloud computing system pursuant to a new VM topology that has a minimum total cost of the cloud computing system pursuant to the business policies stored in the ODB.

2. The method of claim 1, said configuring comprising:

identifying a virtual machine and hardware manager (VMM) coupled to said each physical server of the cloud computing system and subsequently storing the identified VMM in the ODB, wherein the SCWB controls operations of said each physical server via the VMM;

defining the business policies and subsequently storing the defined business policies in the ODB;

defining and subsequently storing, in the ODB, one or more physical server availability zones, one or more physical server restriction zones, and one or more physical server location pools, wherein the physical server availability zones define a first logical group of physical servers sharing one or more external physical components, wherein all physical servers in a same physical server availability zone operate atomically but are not partially available, wherein said one or more external physical components are selected from the group consisting of a power distribution unit, a datacenter room, a rack, a network switch, an external storage, and combinations thereof, wherein the physical server restriction zones define a second logical group of physical servers within a specific physical server availability zone that dynamically represents a specific logical condition with respect to available software applications during a specific time period, and wherein the physical server location pools define a third logical group of physical servers having high communication requirements and are locally hosted by a same datacenter or a network, wherein the SCWB prevents a network congestion resulting from high data traffic between remote virtual machines;

creating and subsequently storing, in the ODB, the one or more software license pools, and defining and subsequently storing, in the ODB, respective available licenses per software application in the created software license pools;
defining and subsequently storing, in the ODB, the power cost of the cloud computing system;
defining and subsequently storing, in the ODB, the at least one virtual machine (VM), and one or more installed licenses per respective VM of the at least one VM; and
defining the VM topology based on the system configuration parameters stored in the ODB.

3. The method of claim 1, said redistributing comprising:
retrieving data items from the ODB;
computing the new VM topology by use of retrieved data items;
turning on a new group of physical servers comprised by the computed new VM topology;
relocating virtual machines pursuant to the computed new VM topology on the new group of physical servers;
turning off a residual group of physical servers not included in the new group of physical servers pursuant to the computed new VM topology; and
updating the retrieved data items in the ODB corresponding to a new status of the cloud computing system pursuant to the computed new VM topology and the new group of physical servers.

4. The method of claim 3, said computing comprising:
minimizing the total cost of the cloud computing system represented by the sum of the respective software cost running on each physical server and the power cost for all running physical servers of the cloud computing system, subject to constraints that each virtual machine (VM) is associated to only one physical server, that a number of VM relocation is limited by a threshold, that each physical server has a predetermined amount of resources to run all VMs assigned for the respective physical server in the new VM topology, that a pair of two virtual machines has either an affinity rule or an anti-affinity rule, wherein the resources are selected from the group consisting of memory, processing clock cycles, and input/output bandwidth, wherein the affinity rule represents a first relationship between the pair of two virtual machines that perform better when the pair run in a same physical server, and wherein the anti-affinity rule represents a second relationship between the pair of two virtual machines that cannot perform in the same physical server, and that the amount of software license usage within the licensed limit; and
maximizing a number of virtual machine relocations onto a same physical server as the VM topology in the new VM topology, subject to the constraints of said minimizing and also subject to other constraints that a relocation cost from the VM topology to the new VM topology is within an acceptable variance of the total cost.

5. The method of claim 3, wherein said computing is mathematically modeled by use of mathematical optimization techniques comprising quadratic programming (QP) and quadratically constrained quadratic program (QCQP), wherein said computing is performed by a QP and QCQP enabled solver coupled to the SCWB.

6. The method of claim 1, said system configuration parameters stored by the ODB further comprising: business policies, one or more physical server availability zones, one or more physical server restriction zones, one or more physical server location pools, the one or more software license pools, respective available licenses per software application in the software license pools, and one or more installed licenses per VM.

7. The method of claim 1, said method further comprising:
providing at least one support service for at least one of creating, integrating, hosting, maintaining, and deploying computer-readable program code in the computer system, said program code being executed by the processor to implement said configuring the cloud computing system, said determining that the cloud computing system does not perform optimally, and said redistributing the workload.

8. A computer program product comprising a computer readable storage device having computer readable program code stored therein, said computer readable program code containing instructions which upon being executed by a processor of a computer system, perform a method for dynamically optimizing workload of a cloud computing system, said method comprising:
configuring, by the processor using a smart cloud workload balancer (SCWB), the cloud computing system into an operative status by defining a virtual machine (VM) topology representing a respective virtual machine assignment for each physical server of the cloud computing system, wherein the cloud computing system services a workload of the cloud computing system by use of the VM topology, and wherein the cloud computing system comprises an objects database (ODB) storing system configuration parameters comprising: business policies, a respective software cost per software application in one or more software license pools, a power cost of the cloud computing system, and at least one virtual machine (VM); and
determining, by the processor, that the cloud computing system does not perform optimally with respect to a total cost of the cloud computing system, wherein said total cost is a sum of the respective software cost and the power cost; and
redistributing, by the processor, the workload of the cloud computing system pursuant to a new VM topology that has a minimum total cost of the cloud computing system pursuant to the business policies stored in the ODB.

9. The computer program product of claim 8, said configuring comprising:
identifying a virtual machine and hardware manager (VMM) coupled to said each physical server of the cloud computing system and subsequently storing the identified VMM in the ODB, wherein the SCWB controls operations of said each physical server via the VMM;
defining the business policies and subsequently storing the defined business policies in the ODB;
defining and subsequently storing, in the ODB, one or more physical server availability zones, one or more physical server restriction zones, and one or more physical server location pools,
wherein the physical server availability zones define a first logical group of physical servers sharing one or more external physical components, wherein all physical servers in a same physical server availability zone operate atomically but are not partially available, wherein said one or more external physical components are selected from the group consisting of a power distribution unit, a datacenter room, a rack, a network switch, an external storage, and combinations thereof,
wherein the physical server restriction zones define a second logical group of physical servers within a specific physical server availability zone that dynamically represents a specific logical condition with respect to available software applications during a specific time period, and wherein the physical server location pools define a third logical group of physical servers having high communication requirements and are locally hosted by a same datacenter or a network, wherein the SCWB prevents a network congestion resulting from high data traffic between remote virtual machines;

creating and subsequently storing, in the ODB, the one or more software license pools, and defining and subsequently storing, in the ODB, respective available licenses per software application in the created software license pools;

defining and subsequently storing, in the ODB, the power cost of the cloud computing system;

defining and subsequently storing, in the ODB, the at least one virtual machine (VM), and one or more installed licenses per respective VM of the at least one VM; and defining the VM topology based on the system configuration parameters stored in the ODB.

10. The computer program product of claim 8, said redistributing comprising:

retrieving data items from the ODB;

computing the new VM topology by use of retrieved data items;

turning on a new group of physical servers comprised by the computed new VM topology;

relocating virtual machines pursuant to the computed new VM topology on the new group of physical servers;

turning off a residual group of physical servers not included in the new group of physical servers pursuant to the computed new VM topology; and updating the retrieved data items in the ODB corresponding to a new status of the cloud computing system pursuant to the computed new VM topology and the new group of physical servers.

11. The computer program product of claim 10, said computing comprising:

minimizing the total cost of the cloud computing system represented by the sum of the respective software cost running on each physical server and the power cost for all running physical servers of the cloud computing system, subject to constraints that each virtual machine (VM) is associated to only one physical server, that a number of VM relocation is limited by a threshold, that each physical server has a predetermined amount of resources to run all VMs assigned for the respective physical server in the new VM topology, that a pair of two virtual machines has either an affinity rule or an anti-affinity rule, wherein the resources are selected from the group consisting of memory, processing clock cycles, and input/output bandwidth, wherein the affinity rule represents a first relationship between the pair of two virtual machines that perform better when the pair run in a same physical server, and wherein the anti-affinity rule represents a second relationship between the pair of two virtual machines that cannot perform in the same physical server, and that the amount of software license usage within the licensed limit; and maximizing a number of virtual machine relocations onto a same physical server as the VM topology in the new VM topology, subject to the constraints of said minimizing and also subject to other constraints that a relocation cost from the VM topology to the new VM topology is within an acceptable variance of the total cost.

12. The computer program product of claim 10, wherein said computing is mathematically modeled by use of mathematical optimization techniques comprising quadratic programming (QP) and quadratically constrained quadratic program (QCQP), wherein said computing is performed by a QP and QCQP enabled solver coupled to the SCWB.

13. The computer program product of claim 8, said system configuration parameters stored by the ODB further comprising: business policies, one or more physical server availability zones, one or more physical server restriction zones, one or more physical server location pools, the one or more software license pools, respective available licenses per software application in the software license pools, and one or more installed licenses per VM.

14. A computer system comprising a processor, a memory coupled to the processor, and a computer readable storage device coupled to the processor, said storage device containing program code which, upon being executed by the processor via the memory, implement a method for dynamically optimizing workload of a cloud computing system, said method comprising:

configuring, by the processor using a smart cloud workload balancer (SCWB), the cloud computing system into an operative status by defining a virtual machine (VM) topology representing a respective virtual machine assignment for each physical server of the cloud computing system, wherein the cloud computing system services a workload of the cloud computing system by use of the VM topology, and wherein the cloud computing system comprises an objects database (ODB) storing system configuration parameters comprising: business policies, a respective software cost per software application in one or more software license pools, a power cost of the cloud computing system, and at least one virtual machine (VM); and determining, by the processor, that the cloud computing system does not perform optimally with respect to a total cost of the cloud computing system, wherein said total cost is a sum of the respective software cost and the power cost; and redistributing, by the processor, the workload of the cloud computing system pursuant to a new VM topology that has a minimum total cost of the cloud computing system pursuant to the business policies stored in the ODB.

15. The computer system of claim 14, said configuring comprising:

identifying a virtual machine and hardware manager (VMM) coupled to said each physical server of the cloud computing system and subsequently storing the identified VMM in the ODB, wherein the SCWB controls operations of said each physical server via the VMM;

defining the business policies and subsequently storing the defined business policies in the ODB;

defining and subsequently storing, in the ODB, one or more physical server availability zones, one or more physical server restriction zones, and one or more physical server location pools, wherein the physical server availability zones define a first logical group of physical servers sharing one or more external physical components, wherein all physical servers in a same physical server availability zone operate atomically but are not partially available, wherein said one or more external physical components are selected from the group consisting of a power distribution unit, a datacenter room, a rack, a network switch, an external storage, and combinations thereof, wherein the physical server restriction zones define a second logical group of physical servers within a specific physical server availability zone that dynamically represents a specific logical condition with respect to available software applications during a specific time period, and wherein the physical server location pools define a third logical group of physical servers having high communication requirements and are locally hosted by a same datacenter or a network, wherein the SCWB prevents a network congestion resulting from high data traffic between remote virtual machines;

creating and subsequently storing, in the ODB, the one or more software license pools, and defining and subsequently storing, in the ODB, respective available licenses per software application in the created software license pools;

defining and subsequently storing, in the ODB, the power cost of the cloud computing system;

defining and subsequently storing, in the ODB, the at least one virtual machine (VM), and one or more installed licenses per respective VM of the at least one VM; and defining the VM topology based on the system configuration parameters stored in the ODB.

16. The computer system of claim 14, said redistributing comprising:

retrieving data items from the ODB;

computing the new VM topology by use of retrieved data items;

turning on a new group of physical servers comprised by the computed new VM topology;

relocating virtual machines pursuant to the computed new VM topology on the new group of physical servers;

turning off a residual group of physical servers not included in the new group of physical servers pursuant to the computed new VM topology; and updating the retrieved data items in the ODB corresponding to a new status of the cloud computing system pursuant to the computed new VM topology and the new group of physical servers.

17. The computer system of claim 16, said computing comprising:

minimizing the total cost of the cloud computing system represented by the sum of the respective software cost running on each physical server and the power cost for all running physical servers of the cloud computing system, subject to constraints that each virtual machine (VM) is associated to only one physical server, that a number of VM relocation is limited by a threshold, that each physical server has a predetermined amount of resources to run all VMs assigned for the respective physical server in the new VM topology, that a pair of two virtual machines has either an affinity rule or an anti-affinity rule, wherein the resources are selected from the group consisting of memory, processing clock cycles, and input/output bandwidth, wherein the affinity rule represents a first relationship between the pair of two virtual machines that perform better when the pair run in a same physical server, and wherein the anti-affinity rule represents a second relationship between the pair of two virtual machines that cannot perform in the same physical server, and that the amount of software license usage within the licensed limit; and maximizing a number of virtual machine relocations onto a same physical server as the VM topology in the new VM topology, subject to the constraints of said minimizing and also subject to other constraints that a relocation cost from the VM topology to the new VM topology is within an acceptable variance of the total cost.

18. The computer system of claim 16, wherein said computing is mathematically modeled by use of mathematical optimization techniques comprising quadratic programming (QP) and quadratically constrained quadratic program (QCQP), wherein said computing is performed by a QP and QCQP enabled solver coupled to the SCWB.

19. The computer system of claim 14, said system configuration parameters stored by the ODB further comprising: business policies, one or more physical server availability zones, one or more physical server restriction zones, one or more physical server location pools, the one or more software license pools, respective available licenses per software application in the software license pools, and one or more installed licenses per VM.

* * * * *